United States Patent
Landrieve (10) Patent No.: US 6,796,713 B2
(45) Date of Patent: Sep. 28, 2004

(54) INSTRUMENTED ANTIFRICTION BEARING PROVIDED WITH A SEALING DEVICE

(75) Inventor: Franck Landrieve, Fondettes (FR)

(73) Assignee: SKF France, Montigny le Bretonneux (FR)

( * ) Notice: Subject to any disclaimer, the term of this patent is extended or adjusted under 35 U.S.C. 154(b) by 0 days.

(21) Appl. No.: 10/221,576

(22) PCT Filed: Mar. 7, 2001

(86) PCT No.: PCT/FR01/00675

§ 371 (c)(1),
(2), (4) Date: Jun. 25, 2003

(87) PCT Pub. No.: WO01/73447

PCT Pub. Date: Oct. 4, 2001

(65) Prior Publication Data

US 2004/0028304 A1 Feb. 12, 2004

(30) Foreign Application Priority Data

Mar. 24, 2000 (FR) .......................................... 00 03803

(51) Int. Cl.[7] .............................. F16C 33/30; G01P 3/44
(52) U.S. Cl. ................... 384/448; 384/486; 324/207.25
(58) Field of Search ................................ 384/448, 486; 324/207.22, 207.25, 173, 174

(56) References Cited

U.S. PATENT DOCUMENTS

| 4,884,901 | A | | 12/1989 | Harsdorff .................... 384/448 |
|---|---|---|---|---|
| 4,946,295 | A | | 8/1990 | Hajzler ........................ 384/448 |
| 5,026,178 | A | | 6/1991 | Ballhaus ...................... 384/448 |
| 5,372,435 | A | | 12/1994 | Genero et al. ............... 384/448 |
| 6,043,643 | A | * | 3/2000 | Message et al. ............. 324/174 |
| 6,094,046 | A | * | 7/2000 | Message et al. ............. 324/174 |
| 6,227,710 | B1 | * | 5/2001 | Message et al. ............. 384/448 |
| 6,400,136 | B1 | * | 6/2002 | Grehn et al. ................ 384/448 |

FOREIGN PATENT DOCUMENTS

| EP | 0 327 434 | 8/1989 |
|---|---|---|
| EP | 0 376 771 | 7/1990 |
| EP | 0 395 783 | 11/1990 |
| EP | 0 495 323 | 7/1992 |
| EP | 0 516 973 | 12/1992 |
| EP | 0 553 716 | 8/1993 |
| FR | 2 375 599 | 7/1978 |
| FR | 2 621 365 | 4/1989 |

* cited by examiner

Primary Examiner—Thomas R. Hannon
(74) Attorney, Agent, or Firm—Smith, Gambrell & Russell (57) ABSTRACT

The invention concerns an instrumented antifriction bearing device provided with a non-rotating part comprising a non-rotating ring (2) and sensing means (11), a rotating part comprising a rotating ring (4) and coding means (16), and at least a row of rolling elements (6) arranged between the two raceways (3, 5) of the non-rotating (2) and the rotating (4) rings, the sensing means (11) being fixed in a groove (10) of said non-rotating ring (2) arranged proximate to a radial lateral surface (2a) of the non-rotating ring (2). The non-rotating part further comprises sealing means (21) arranged axially between the sensing means (11) and the rolling elements (6) substantially at the groove (10), the sealing means (21) being separate from the sensing means (11).

10 Claims, 5 Drawing Sheets

FIG_1

FIG_2

FIG_3

FIG_4

FIG_5

INSTRUMENTED ANTIFRICTION BEARING PROVIDED WITH A SEALING DEVICE

The present invention relates to the field of instrumented antifriction bearings equipped with an assembly for detecting rotation parameters such as the angular rotation, the direction of rotation, the speed and/or the acceleration.

In a way which is known, for example, from document EPA-0 327 434, an instrumented antifriction bearing generally comprises a detection assembly consisting of a sensor secured to the non-rotating ring of the bearing and of an encoder secured to the rotating ring of the bearing. The encoder rotates past the sensor in such a way that the sensor generates a signal that represents the rotation parameters of the encoder, for example a sinusoidal or squarewave electrical signal, the frequency of which is proportional to the rotational speed of the encoder. The encoder may be of multi-pole magnetic or of optical type and operates in collaboration with a sensor of corresponding type, that is to say a magneto-sensitive sensor in the case of a magnetic encoder and an optical sensor in the case of an optical encoder. The sensor and the encoder are arranged on one side of the bearing, each being fixed to the corresponding ring by means of a support. Each of the supports is fixed by push-fitting onto a cylindrical bearing surface of the corresponding ring, which is machined for that purpose.

To prevent the ingress of external contaminants likely to degrade the operation of the detection assembly and the operation of the bearing, seals are provided on each side of said bearing. On the opposite side to the detection assembly, a seal formed of a metal end plate over which a supple portion is overmolded is fixed into an annular groove in the outer ring. A lip originating from the supple portion rubs against a rubbing surface of the inner ring. On the same side as the detection assembly, a seal also made up of a metal end plate and of a supple portion is fixed to a bore of the sensor support. A lip originating from the supple portion rubs against a rubbing surface of the support of the encoder means.

The special-purpose machining operations required for fixing the encoder and the sensor which are mounted on their supports are expensive and relatively bulky.

Furthermore, in the case of a detection assembly of optical type it is necessary to avoid the ingress of bearing lubricant between the encoder and the sensor.

It is an object of the present invention to overcome the disadvantages of the devices of the prior art.

It is an object of the present invention to propose an instrumented antifriction bearing in which the rings are of standard type designed to be used both with or without detection assembly, and comprising a seal between the rolling elements and the gap between the sensor and the encoder.

The instrumented antifriction bearing device according to the invention is of the type provided with a non-rotating part comprising a non-rotating ring and a sensor means, with a rotating part comprising a rotating ring and an encoder means, and with at least one row of rolling elements arranged between two raceways of the non-rotating and rotating rings, the sensor means being fixed in a groove of the non-rotating ring arranged near a radial lateral face of said non-rotating ring. The non-rotating part further comprises a sealing means arranged axially between the sensor means and the rolling elements substantially at the groove, the sealing means being distinct from the sensor means.

A seal is thus provided between the sensor means and the rolling elements. The sensor means may be fixed in a standard groove able, in other uses, to accommodate a seal. The encoder means may be fixed to a standard bearing surface of the rotating ring able to collaborate, in other uses, with a seal. It is thus possible to use inexpensive standard rings manufactured and used in great numbers for sealed antifriction bearings of the "ISO" series, which have no means of measuring rotation parameters. The gap between the encoder and the sensor is effectively isolated from the lubricant placed in the bearing.

An antifriction bearing with information sensor is thus obtained very economically from elements of a conventional basic antifriction bearing, which elements can be chosen from the "ISO" range of the bearing manufacturers.

Advantageously, the non-rotating ring comprises two grooves arranged one on each side of the rolling elements. The profiles of the two grooves may be identical. The non-rotating ring may be symmetric with respect to a plane passing through the center of the rolling elements.

Advantageously, the sensor means comprises a support, a part of which is arranged in said groove with the non-rotating ring for the fixing of said sensor means to said non-rotating ring. The part arranged in said groove may be of a diameter larger than that of the remainder of the support. The sensor support here is mounted in the place of a conventional bearing seal.

In one embodiment of the invention, the sealing means is arranged radially between a support of the sensor means and the rotating ring.

Advantageously, the sealing means comprises a substantially radial portion of annular shape and an attachment portion in contact with the sensor means. The attachment portion may collaborate with the support of the sensor means. The attachment portion may be mounted with radial gripping on the sensor means.

In one embodiment of the invention, the attachment portion of the sealing means is also in contact with the non-rotating ring.

In one embodiment of the invention, the attachment portion of the sealing means comprises a bulge made of supple material. The bulge may project into said groove and be in contact both with the support of the sensor means and with the non-rotating ring. The bulge may contribute to holding the support of the sensor means in place.

In another embodiment of the invention, the attachment portion of the sealing means comprises an oblique rim originating from the substantially radial portion.

Advantageously, the sensor means comprises an opening for mounting the sealing means, which opening is situated opposite the rolling elements and allows said sealing means to be introduced into the sensor means toward the rolling elements.

Another subject of the present invention is a method of assembling an instrumented antifriction bearing device. The bearing is of the type provided with a non-rotating part comprising a non-rotating ring and a sensor means, with a rotating part comprising a rotating ring and an encoder means, and with at least one row of rolling elements arranged between two raceways of the non-rotating and rotating rings, in which a sealing means is placed axially between the sensor means and the rolling elements, the sealing means being distinct from the sensor means, the sensor means being fixed in a groove of the non-rotating ring arranged near a radial lateral face of said non-rotating ring, the sealing means being arranged substantially at the groove.

The sealing means may radially grip the sensor means. The sealing means may be mounted via an opening in the sensor means situated opposite the rolling elements.

It is possible to mount the support of the sensor means, then the sealing means, then the rest of the sensor means, said support leaving an opening for the passage of the sealing means. These steps of assembly employ simple movements which can be performed economically using a press.

The present invention will be better understood from studying the detailed description of some embodiments taken by way of non-limiting examples and illustrated by the appended drawings, in which.

Figure 1:
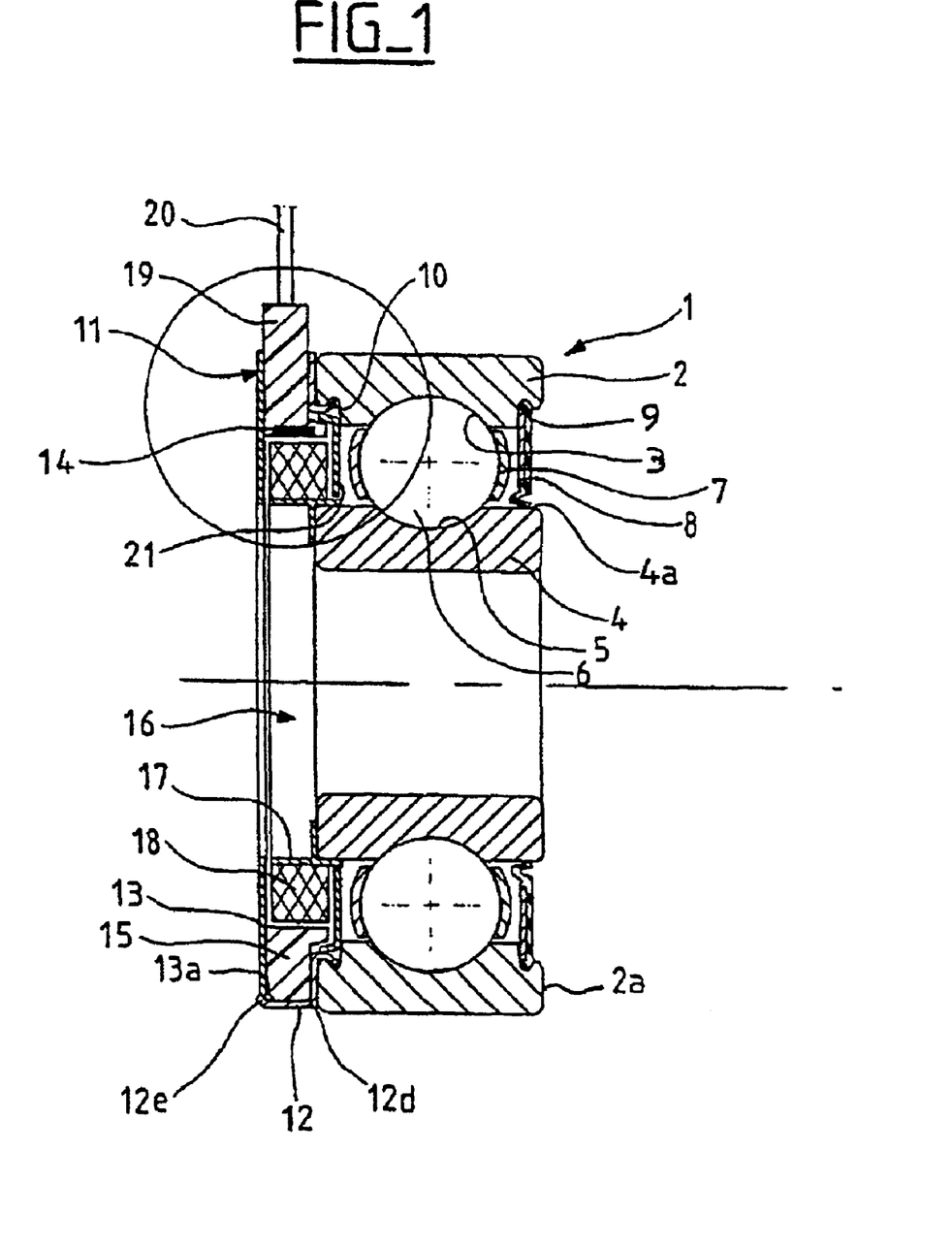
FIG. 1 is a view in axial section of an antifriction bearing according to a first embodiment of the invention.
Figure 2:
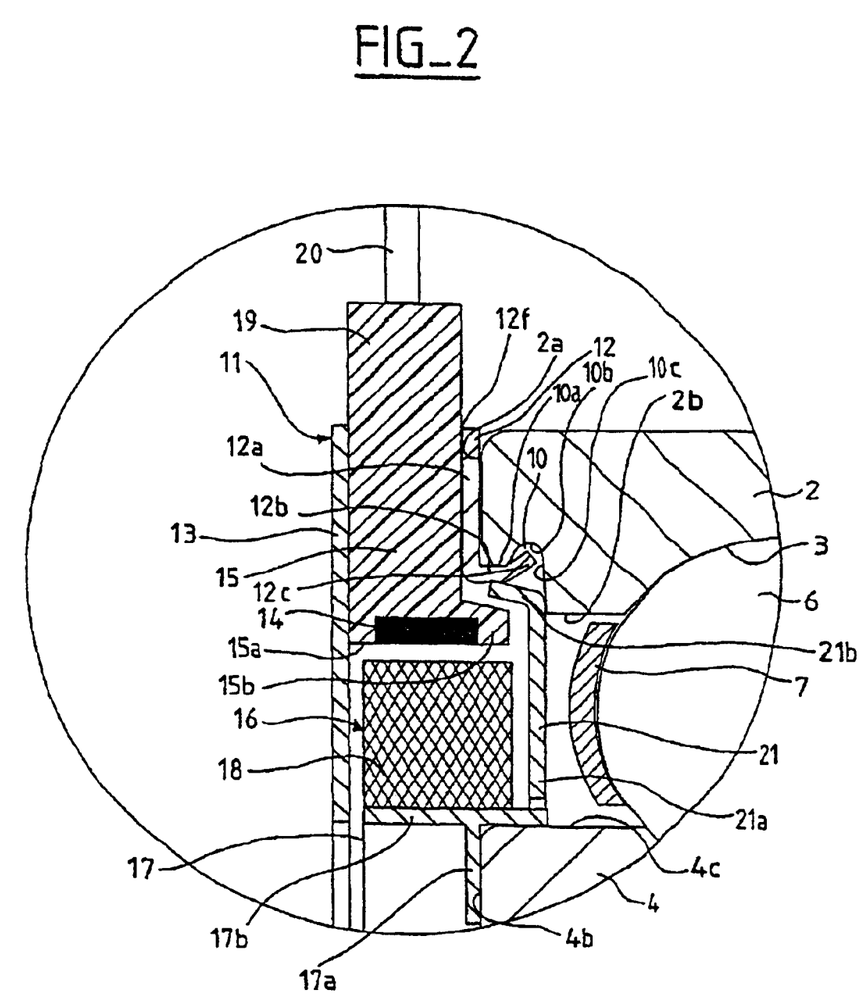
FIG. 2 is an enlarged part view of the antifriction bearing of FIG. 1.

As can be seen in FIGS. 1 and 2, an antifriction bearing 1 comprises an outer ring 2 provided with a raceway 3, an inner ring 4 provided with a raceway 5, a row of rolling elements 6, in this instance, balls, arranged between the raceways 3 and 5, a cage 7 for maintaining the circumferential spacing of the rolling elements 6, and a seal 8 mounted on the outer ring 2 and rubbing on a cylindrical bearing surface 4a of the inner ring 4 while at the same time being arranged radially between said two rings 2 and 4 and axially between the row of rolling elements 6 and one of the lateral surfaces of said rings 2, 4. The seal 8 is mounted in an annular groove 9 formed in the outer ring 2 near its radial lateral surface 2a. On the opposite side, the outer ring 2 is also provided with a groove 10 symmetric with the groove 9 with respect to a plane passing through the center of the rolling elements 6.

The groove 10 comprises a substantially cylindrical surface 10a adjacent the radial lateral surface 2a, a concave surface 10b forming the bottom of said groove 10, and an oblique surface 10c situated on the same side as the rolling elements 6 and meeting the bore 2b of the outer ring 2.

A sensor unit referenced 11 in its entirety is mounted on the outer ring 2 on the same side as the groove 10. The sensor unit 11 comprises a metal support 12, a metal cap 13 and a sensor element 14 embedded in a synthetic central part 15.

The metal support 12, of annular overall shape, comprises a radial wall 12a in contact with a radial front surface 2a of the outer ring 2 on the same side as the groove 10 and continued on its internal edge by a substantially tubular rim 12b in contact with the surface 10a of the groove 10 and the free end 12c of which is folded radially outward into the groove 10 and attaches the support 12 to the outer ring 2. The free end 12c has a frustoconical shape. The metal support 12 also comprises a cylindrical part 12d extending from the outer edge of the radial part 12a axially away from the bearing 1 and ending in a rim 12e bent obliquely slightly inward. The cylindrical part 12d is provided with a notch 12f.

The metal cap 13 has the overall shape of a disk with one end of large diameter 13a bent slightly toward the outer ring 2 and collaborating with the rim 12e of the cylindrical part 12d, said rim 12e holding the cap 13 on by gripping around the end 13a.

Outside of the region of the notch 12f, the central part 15 is bounded radially by the cylindrical part 12d of the support 12 toward the outside and has a bore 15a of such a diameter that there is enough radial space for the encoder, which will be described later on. The sensor element 14, which is secured to the central part 15, lies flush with the bore 15a. One end of the central part 15 projecting radially outward forms a terminal 19 for leading out a wire 20. Said terminal 19 passes through the notch 12e of the cylindrical part 12d.

An encoder 16 comprises an annular support 17 and an active part 18. The support 17 is of annular shape with T-shaped cross section and comprises a radial portion 17a axially in contact with a radial front surface 4b of the inner ring 4 on the same side as the sensor unit 11 and a cylindrical portion 17b extending from the outer edge of the radial portion 17a axially on both sides, being push-fitted on the same side as the inner ring 4 onto a cylindrical bearing surface 4c of said inner ring 4. The bearing surface 4c is preferably symmetric with the bearing surface 4a with respect to a radial plane passing through the center of the rolling elements 6.

The active part 18 of the encoder 16 is of annular shape with generally rectangular cross section and arranged on the outer periphery of the cylindrical portion 17b. The active part 18 extends axially toward the rolling elements 6 beyond the radial portion 17a between the outer 2 and inner 4 rings, substantially as far as the groove 10 of the outer ring 2.

The active part 18 extends to close to the bore 15a of the central part 15, with which it forms a radial gap. As the inner ring 4 rotates with respect to the outer ring 2, the active part 18 of the encoder 16 rotates past the sensor element 14, which is capable at output of supplying an electrical signal. What happens is that the active part 18 of the encoder 16 is a multi-pole magnetized ring, for example made of plasto-ferrite. The encoder 16 and the sensor unit 11 form an assembly for detecting rotation parameters.

The inside diameter of the cap 13 is substantially equal to the diameter of the cylindrical portion 17b of the support 17 of the encoder 16. A narrow passage creating a seal is formed between the cap 13, on the one hand, and the active part 18 and the end of the cylindrical portion 17b of the support 17 opposite the rolling elements 6 on the other. On the same side as the rolling elements 6, the cylindrical portion 17b of the support 17 extends beyond the active part 18.

The bearing 1 also comprises a sealing element 21 of annular shape provided with a radial portion 21a and with an oblique portion 21b extending outward from the large-diameter free end of the radial portion 21a. The inside diameter of the sealing element 21 is slightly greater than the outside diameter of the cylindrical portion 17b of the support 17 of the encoder 16. The sealing element 21 is arranged axially between the active part 18 of the encoder 16 and the cage 7 of the rolling elements 6 and radially between the tubular rim 12b of the support 12 of the sensor unit 11 and the cylindrical portion 17b of said support 17. The free end of the oblique portion 21b is in contact with the interior surface of the tubular rim 12b, on which it presses radially outward. The sealing element 21 is also in contact via a region forming a join between the radial portion 21a and the oblique portion 21b with the surface 10c of the groove 10 near the bore 2b.

Thus, a narrow passage creating a seal is formed radially between the small-diameter end of the radial portion 21a of the sealing element 21 and the cylindrical portion 17b of the support 17 of the encoder 16, and axially between the radial portion 21a and the active part 18 of the encoder 16. Contact between the sealing element 21 and the oblique surface 10c of the groove 10 of the outer ring 2 ensures sealing even if the rim 12b and the free end 12c of the support 12 of the sensor unit 11 are cut into tabs to make them easier to bend toward the surface 10b of the bottom of the groove 10. The oblique portion 21b of the sealing element 21 has a diameter in the free state which exceeds the inside diameter of the tubular rim 12b of the support 12. In the assembled state illustrated in FIGS. 1 and 2, said oblique portion 21b exerts a radially outwardly directed preload on said tubular rim 12b and this tends to strengthen the retention of the support 12 in the groove 10 of the outer ring 2.

It may be noted that the sealing element 21, once mounted, is situated axially at the groove 10 of the outer ring and therefore within the axial bulk of the bearing, and this constitutes an appreciable factor in terms of the compactness of the device.

The sensor-encoder assembly may be assembled as follows. First of all, the support 12 is placed on the outer ring 2 and the free end 12c is bent outward, thus retaining it in the groove 10 of the outer ring 2, the free end 12c being tubular, prior to assembly, after the manner of the rim 12b. With an axial movement, the sealing element 21 is introduced through the opening consisting of the bore of the rim 12b and said sealing element 21 is moved toward the rolling elements 6, the end of this movement causing the oblique portion 21b to slide with gripping along the bore of the tubular rim 12b. The movement is halted by contact between the sealing element 21 and the oblique surface 10c of the groove 10 in close proximity to the bore 2b of the outer ring 2. Next, in a radial movement, the encoder 16 is brought in and its support 17 is push-fitted onto the bearing surface 4c of the inner ring 4. Finally, the central part 15 incorporating the sensor element 14 is arranged in the cylindrical part 12d of the support 12, then the cap 13 is brought in and the end rim 12e of the cylindrical part 12d is bent inward and this retains the cap 13 and therefore the central part 15.

In other words, the sensor unit 11 is designed in such a way that the support 12 comprises an opening for mounting of the sealing element 21. The opening in this instance is formed by the bore of the cylindrical part 12d and that of the tubular rim 12b. The opening has a radial dimension such that it allows the sealing element 21 to be mounted, preferably in a simple axial movement.

Furthermore, the inclination of the oblique portion 21b allows an axial movement of the sealing element 21 toward the rolling elements, which allows said element to be mounted on the support 12, but through a bracing effect prevents any axial movement of the sealing element 21 in the opposite direction, thus avoiding an accidental disassembly of said element once it has been placed on the support.

To reduce the axial bulk of the instrumented antifriction bearing 1 in its entirety, the central part 15 is provided with an annular protrusion 15b extending axially toward the rolling elements 6 and flush with the bore 15a of said central part 15. The protrusion 15b is arranged radially between the active part 18 of the encoder 16 on the one hand, and the oblique portion 21b of the sealing element 21 and the tubular rim 12b of the support 12 on the other. The protrusion 15b may be provided with an oblique outer surface which corresponds in terms of shape with the oblique portion 12b of the sealing element 21. The protrusion 15b serves in part to house the sensor element 14, hence a reduction in axial bulk. In other words, the protrusion 15b is arranged partly between the two, outer 2 and inner 4, rings, and the sensor element 14 lies flush with the plane of the radial front surfaces 2a and 4a of said outer 2 and inner 4 rings.

Figure 3:
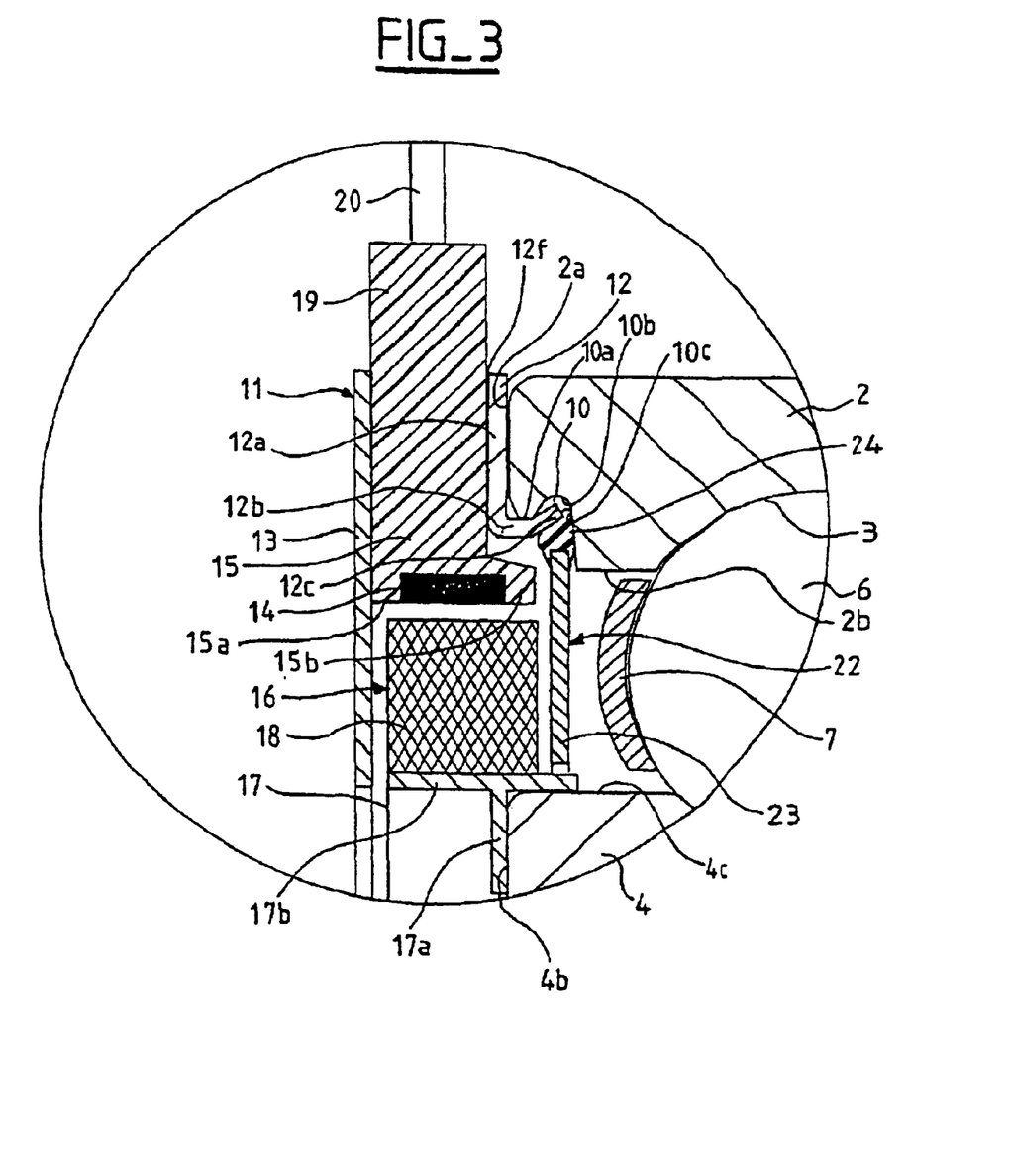
FIG. 3 is an alternative form of FIG. 2.

The alternative form illustrated in FIG. 3 is similar to the one described hereinabove except that the sealing element 22 comprises a radial disk 23 of a size that corresponds to the radial portion 21a illustrated in FIGS. 1 and 2 and arranged substantially at the same point in the bearing 1. The sealing element 22 is supplemented by an annular bulge 24, for example made of rubber or elastomer overmolded onto the outer edge of the disk 23. The outside diameter of the disk 23 is smaller than the bore of the tubular rim 12b of the support 12. The bulge 24 is arranged, in the mounted state, in contact, on one side, with the oblique surface 10c of the groove 10 and, on the other side, with the free end 12c, of frustoconical shape, of the support 12.

Thus, an excellent seal is obtained between the disk 23 and the outer ring 2. The bulge 24, which is slightly compressed in the mounted state, exerts a preload on the free end 12c, and this preload is essentially directed radially outward and tends therefore to reinforce the retention of said support 12 in the groove 10 of the outer ring 2. The sealing element 22 is mounted by forcibly pushing it into the bore of the tubular rim 12b of the support 12, the bulge 24 deploying into the groove 10 at the end of the radial mounting movement.

In the two alternative forms described hereinabove, it would be entirely possible to provide a sealing lip secured to the sealing element 21 or 22 and collaborating with the support 17 of the encoder 16 or alternatively a sealing lip secured to said support 17 and rubbing against the sealing element 21. The axial bulk of the instrumented antifriction bearing 1 is not altered by the presence of the sealing element, which is mounted at a similar location to that of a conventional sealed, but uninstrumented, bearing. The sealing element makes judicious use of the axial space which in any case is needed for the attachment of the sensor unit 1 in the groove 10. The sealing element is of simple shape and constitutes a part distinct from the sensor unit, the various elements of which also have relatively simple shapes.

Figure 4:
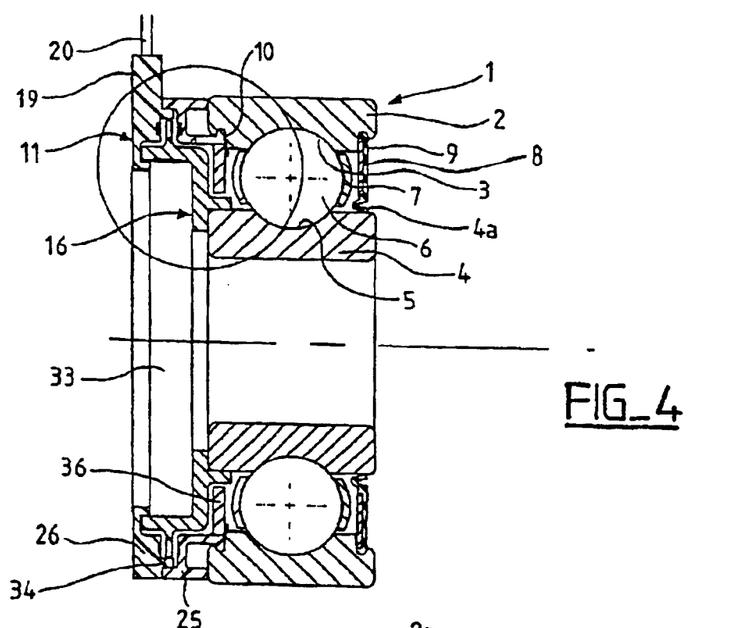
FIG. 4 is a view in axial section of an antifriction bearing according to a second embodiment of the invention.
Figure 5:
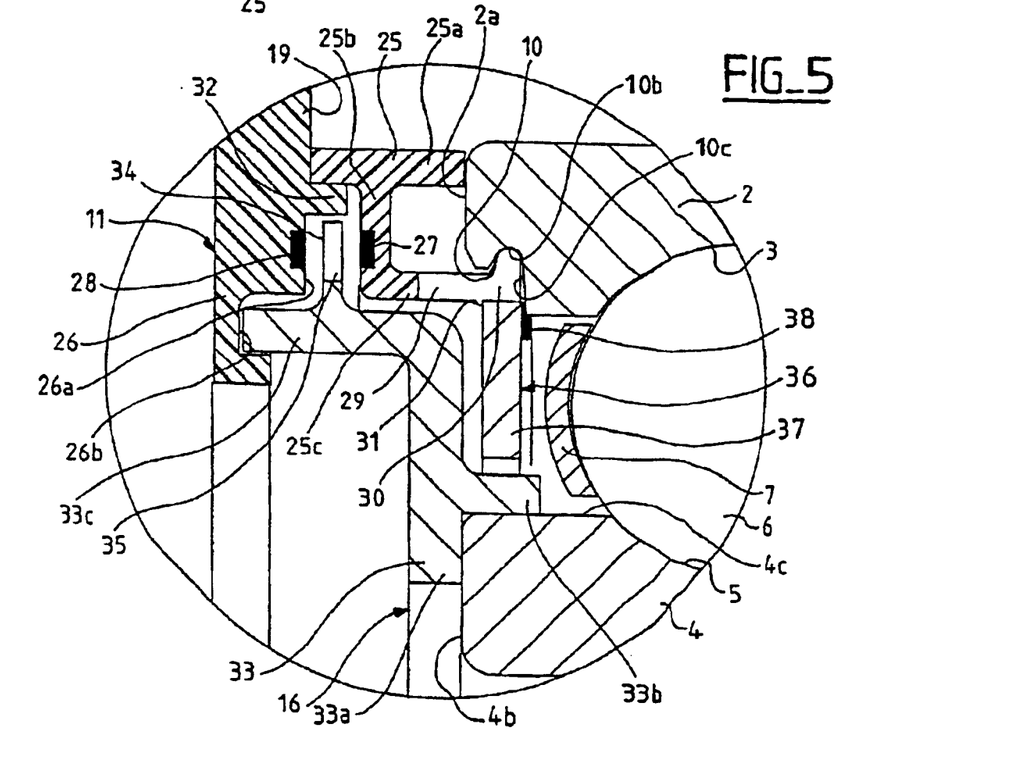
FIG. 5 is an enlarged part view of the antifriction bearing of FIG. 4.

In the embodiment illustrated in FIGS. 4 and 5, the elements which are similar to those of the preceding figures bear the same references. The sensor unit 11 comprises two parts 25 and 26. The first part 25 is attached to the outer ring 2 and supports a light source 27. The second part 26 is attached to the first part 25 and supports an optical sensor 28. An axial space is provided between the light source 27 and the optical sensor 28.

More specifically, the first part 25 made of synthetic material comprises a tubular portion 25a, a free of which is in contact with the radial surface 2a of the outer ring 2, and a radial portion 25b extending inward from the bore of the tubular portion 25a. The tubular portion 25a and the radial portion 25b are annular and are substantially T-shaped. The light source 27 lies flush with a radial surface of the radial portion 25b on the opposite side to the rolling elements 6. The first part 25 also comprises an attachment portion 25c extending from the small-diameter end of the radial portion 25b toward the rolling elements 6. The attachment portion 25c has a cylindrical overall shape and is cut at its free end opposite the radial portion 25b into a number of elastic tabs 29. Each elastic tab 29 is provided with a hook 30 extending radially outward and in contact with the concave surface 10b of the groove 10. The tabs 29 also comprise studs 31 arranged on their interior surface and the function of which will be explained below. The studs 31 have a substantially radial surface on the same side as the rolling elements 6 and an oblique slope on the opposite side to the rolling elements 6.

The second part 26 of the sensor unit 11, made of synthetic material, is of annular and radial overall shape and has an axial protrusion 32, of annular shape, push-fitted into the bore of the tubular portion 25a of the first part 25 at its opposite end to the radial surface 2a of the outer ring 2. The optical sensor 28 lies flush with a radial surface 26a and is arranged facing the light source 27. The radial surface 26 is arranged near the axial protrusion 32 and surrounded thereby. The second part 26 also has an axial annular groove 26b adjacent the radial surface 26a and of smaller diameter.

The encoder 16 comprises a support 33 and an active part 34, which are formed integrally and made of metal. The support 33 comprises a radial portion 33a, in contact with the radial surface 4b of the inner ring 4 on its interior edge, and an axial protrusion 33b extending axially toward the rolling elements 6 from the radial portion 33a and push-fitted onto the bearing surface 4c of the inner ring 4. The support 33 of the encoder 16 also comprises a tubular portion 33c extending axially away from the rolling elements 6 from the large-diameter free end of the radial portion 33a. The tubular portion 33c has a smaller diameter than the bore of the attachment portion 25c of the first part 25 of the sensor unit 11 and projects by its free end into the groove 26b of the second part 26 of the sensor unit 11 with which it forms a narrow passage, ensuring the seal. The active part 34 of the encoder 16 is of radial shape running outward from the exterior surface of the tubular portion 33c of the support 33 and is arranged in the axial space that there is between the light source 27 and the optical sensor 28. The active part 34 has a smaller diameter than the bore of the protrusion 32 which surrounds it. The active part 34 is cut into a number of uniformly circumferentially-spaced crenellations 35 such that a beam of light emitted by the source 27 passes periodically between the crenellations 35 of the active part 34, the period being linked to the speed of relative rotation between the encoder 16 and the sensor unit 11.

The instrumented antifriction bearing 1 also comprises a sealing element 36 comprising a metal radial annular disk 37 and a supple covering 38 secured to the disk 37 and arranged on the radial surface of said disk 37 on the same side as the rolling elements 6 and in close proximity to its outer edge. The sealing element 36 is arranged axially between the cage 7 and the radial portion 33a of the support 33 of the encoder 16 and axially between the push-fitting protrusion 33b of said support 33 and the attachment portion 25c of the first part 25 of the sensor unit 11.

More specifically, the covering 38 of the sealing element 36 is in contact with the oblique surface 10c of the groove 10. The exterior surface of the annular disk 37 is in contact with the interior surface of the hooks 30 and is held back by the studs 31 against any axially disassembly movement in a direction away from the rolling elements 6.

The encoder-sensor assembly is assembled in the same order as the embodiment of FIGS. 1 to 3. First of all, the first part 25 is fixed by arranging the hooks 30 in the groove 10. The sealing element 36 is then forced axially and slides along the interior surface of the attachment portion 25c, past the studs 31, and adopts its definitive position axially between the studs 31 and the oblique surface 10c of the groove 10. In this position, the hooks 30 are held in the groove 10, which they can no longer leave. The encoder 16 is then push-fitted onto the bearing surface 4c of the inner ring 4 until the radial portion 33a of the support 33 comes into contact with the radial surface 4b of the inner ring 4. Finally, the second part 26 of the sensor unit 11 is push-fitted into the bore of the tubular portion 25a of the first part 25, it being possible for the two parts 25 and 26 of the sensor unit to be secured together definitively by, for example, ultrasound welding.

The static seal between the sealing element 36 and the outer ring 2 is afforded by the supple elastomer or equivalent covering 38. The dynamic seal between the sealing element 36 and the rotating part is afforded by the narrow passage formed between the radial disk 37 and, on the one hand, the push-fitting protrusion 33b and, on the other hand, the radial portion 33a of the support 33. The static seal between the support 33 and the inner ring is afforded by the push-fitting of the protrusion 33b onto the bearing surface 4c. The dynamic seal between the encoder 16 and the sensor unit 1 is afforded by the narrow passage produced by the free end of the cylindrical portion 33c of the support 33 projecting into the groove 26b of the first part 26 of the sensor unit 11.

Thus, the radial gripping of the disk 37 of the sealing element 36 in the annulus of fixing hooks 30 has the effect of strengthening the radial gripping of the hooks 30 in the groove 10 and therefore the retention of the sensor unit 11 in the outer ring 2. The small studs 31 projecting inward prevent any disassembly of the sealing element 36 once it has been fitted. Here, again, the sealing element 36 is fixed in the axial region of the groove 10 and does not in any way increase the axial bulk of the instrumented bearing 1.

Figure 6:
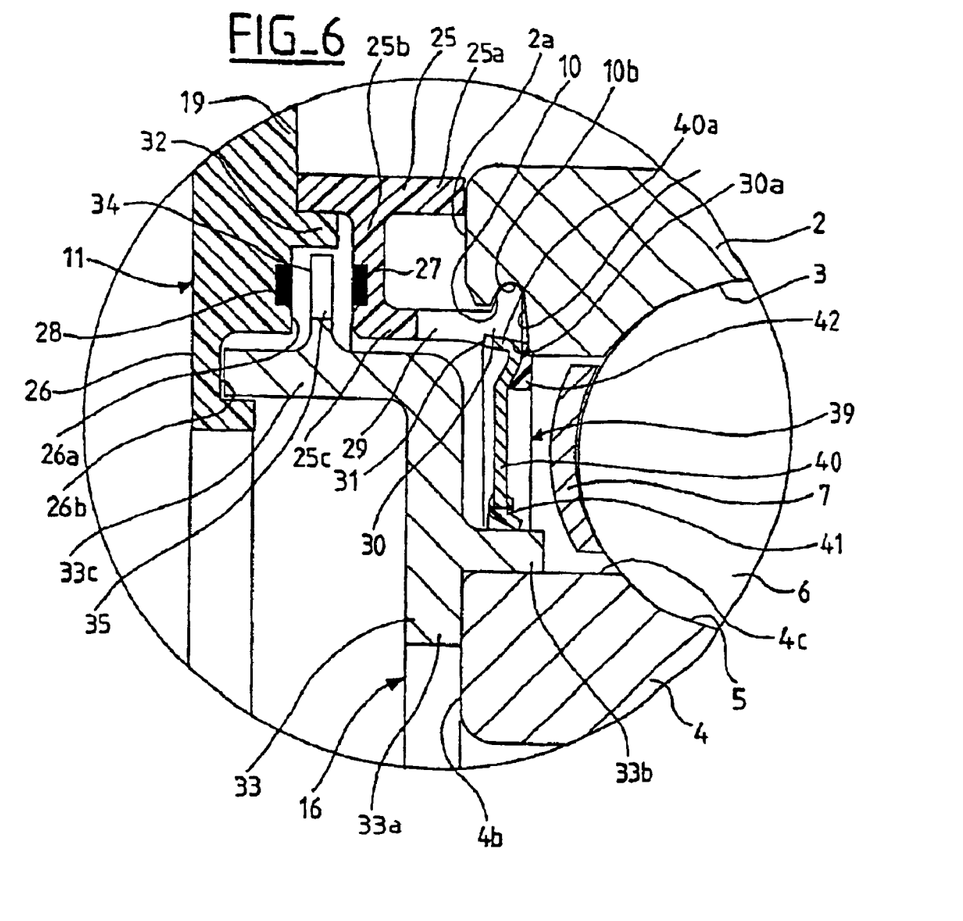
FIG. 6 is an alternative form of FIG. 5.

In the alternative form of FIG. 6, the elements which are similar to those of FIGS. 4 to 5 bear the same references. The sealing element 39 comprises a rigid part 40 made of sheet metal, a sealing lip 41 overmolded on the interior edge of the rigid part 40 and rubbing against the exterior surface of the protrusion 33b of the support 33 of the encoder 16, thus affording an excellent dynamic seal, and a supple covering 42 overmolded on the rigid part 40 and in contact with the oblique surface 10c of the groove 10. The covering 42 and the sealing lip 41 can be made of elastomer, rubber or of any other equivalent material which affords a static seal in one case and a dynamic seal in the other.

The rigid part 40, which is of radial overall shape, is provided on its outer edge with an oblique end 40a in contact with the interior surface 30a of the annulus of hooks 30. Said interior surface 30a corresponds in terms of shape with said oblique end 40a. The dynamic end 40a is also in contact with the studs 31, preventing disassembly. The free end 40a is formed in such a way that its slope with respect to the axis of the bearing 1 tends to prevent disassembly of the first part 27 from the sensor unit 11. Thus, during assembly of the sealing element 39, the free end 40a snap-fits beyond the studs 31 and is particularly effective at opposing any disassembly movements.

By virtue of the invention, a compact instrumented antifriction bearing is produced which is particularly well protected and economical to manufacture by virtue of the use of standard elements both for the outer ring and for the inner ring of the bearing. The various elements of the encoder-sensor assembly are mounted using simple axial movements, for example those achieved by means of a press, and this is inexpensive.

What is claimed is:

1. An instrumented antifriction bearing device of the type provided with a non-rotating part comprising a non-rotating ring and a sensor means, with a rotating part comprising a rotating ring and an encoder means, and with at least one row of rolling elements arranged between two raceways of the non-rotating and rotating rings, the sensor means being fixed in a groove of the non-rotating ring arranged near a radial lateral face of said non-rotating ring, the non-rotating part further comprising a sealing means arranged axially between the sensor means and the rolling elements substantially at the groove, the sealing means being distinct from the sensor means, wherein the sealing means is arranged radially between a support of the sensor means and the rotating ring.

2. The device as claimed in claim 1, wherein the attachment portion is mounted with radial gripping on the sensor means.

3. The device as claimed in claim 1, wherein the sensor means comprises an opening for mounting the sealing means, which opening is situated opposite the rolling elements and allows said sealing means to be introduced into the sensor means toward the rolling elements.

4. The device as claimed in claim 1, wherein the sealing means comprises a substantially radial portion of annular shape and an attachment portion in contact sensor means.

5. The device as claimed in claim 4, wherein the attachment portion of the sealing means is also in contact with the non-rotating ring.

6. The device as claimed in claim 4, wherein the attachment portion of the sealing means comprises a bulge made of supple material.

7. The device as claimed in claim 4, wherein the attachment portion of the sealing means comprises an oblique rim originating from the substantially radial portion.

8. A method of assembling an instrumented antifriction bearing device of the type provided with a non-rotating part comprising a non-rotating ring and a sensor means, with a rotating part comprising a rotating ring and an encoder means, and with at least one row of rolling elements arranged between two raceways of the non-rotating and rotating rings, in which a sealing means is placed axially between the sensor means and the rolling elements, the sealing means being distinct from the sensor means, the sensor means being fixed in a groove of the non-rotating ring arranged near a radial lateral face of said non-rotating ring, the sealing means being arranged substantially at the groove, the sealing means being arranged radially between a support of the sensor means and the rotating ring.

9. The method as claimed in claim 8, wherein the sealing means radially grips the sensor means.

10. The method as claimed in claim 9, wherein the sealing means is mounted through an opening in the sensor means situated opposite the rolling elements.

* * * * *